April 19, 1966 P. ALIMAS 3,246,416
SPINNING LURE
Filed June 15, 1964
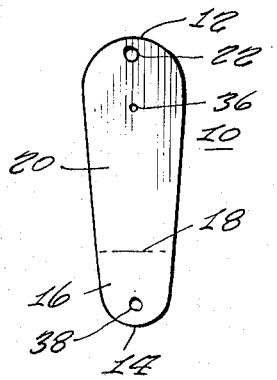
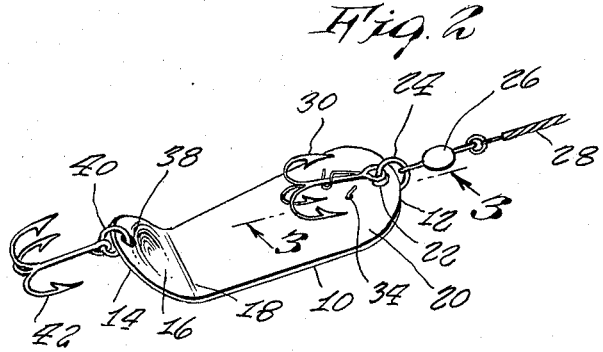
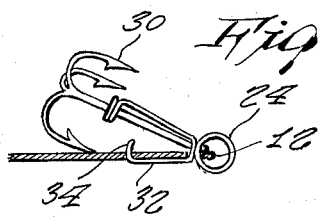
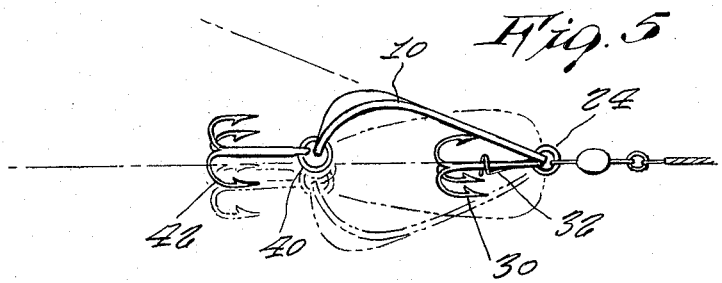
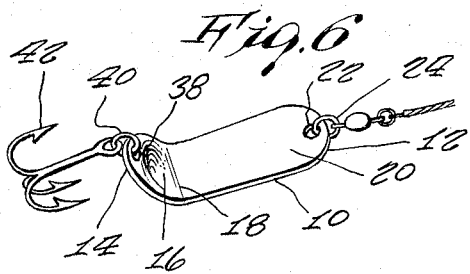
INVENTOR.
PAUL ALIMAS

United States Patent Office 3,246,416
Patented Apr. 19, 1966

3,246,416
SPINNING LURE
Paul Alimas, Toronto, Ontario, Canada; Anna Alimas,
executrix of said Paul Alimas, deceased
Filed June 15, 1964, Ser. No. 375,057
1 Claim. (Cl. 43—42.52)

My invention is directed to spinning lures for use by fishermen and more particularly to a lure which is free from jerks or wobbles, runs smoothly through the water, is fast spinning, spreads glaring, and is widely visible from all directions.

It is an object of my invention to provide a new and improved spinning lure of the character indicated.

Another object is to provide a new and improved spinning lure of the character indicated which can be manufactured easily and inexpensively.

All of the foregoing and still further objects and advantages of my invention will now be explained with reference both to this specification and to the drawings wherein:

FIGURE 1 is a plan view of a blank from which the lure body is made;

FIGURE 2 is a perspective view of the assembled invention;

FIGURE 3 is a cross section through 3—3 of FIGURE 2 but showing the modified spring of FIG. 4;

FIGURE 4 is a view of a modified form of a spring that may be used in the invention which spring has a coil at one end thereof;

FIGURE 5 is a side view of the invention in operative position; and

FIGURE 6 is a modification of the invention.

Referring now to FIGURES 1-5, a metal blank 10 formed from or coated with silver has an elongated oval shape with a broad end 12 and a narrow end 14. The lower third 16 of the blank including end 14 is bent along horizontal line 18 to make a right angle with respect to the remainder of the blank.

The lower third 16 is ladle shaped to prevent straightening. The top two-third section 20 is flat and adjacent end 12 has a hole 22 through which a ring 24 extends, ring 24 being connected by element 26 to line 28. Upper fish hooks 30 are connected to one end of a spring 32 on one side of section 20. Spring 32 extends through hole 22 and bends around, the other end of spring 32 having a prong 34 fitting into a second hole 36 from the opposite side of section 20. Spring 32 holds upper hooks 30 in position against section 20.

End 14 also has a hole 38 through which a second ring 40 extends, lower fish hooks 42 being connected to ring 40.

The combination of the flat body and the bent lower portion gives the lure vivacity in the water. It spins about eight times through every three feet of distance through which the lures is pulled. With the lure in motion, when the fish approaches the lure from the side, the upper portion of the lure produces a glare. When the fish is past the lure, the ladle shaped portion produces a constant shine. By virtue of spring 32, hooks 30 cannot swing away from section 20. Such action if permitted would impair the spinning function and desired glare and shine.

In the lure of FIGURE 6, upper fish hooks 30 and spring 32 are eliminated, the lure otherwise being as described above.

While I have described my invention with particular reference to the drawings, my protection is to be limited only by the terms of the claim which follows.

Having thus described my invention, I claim as new and desire to secure by Letters Patent:

A lure comprising a silver colored flat elongated oval shaped metal blank having a broad end and a ladle shaped portion including a narrow end, the lower third of said blank including said portion being bent approximately at right angles to the remainder of said blank, a first set of fish hooks secured to said narrow end in movable pivotal relationship, a second set of fish hooks secured to said broad end, and a spring holding said second set against a surface of the remainder of said blank.

References Cited by the Examiner
UNITED STATES PATENTS

| 916,691 | 3/1909 | Fey | 43—42.5 |
| 2,419,753 | 4/1947 | Adair | 43—42.52 X |
| 2,463,889 | 3/1949 | Lundems | 43—42.5 X |
| 2,817,921 | 12/1957 | Czesnocha | 43—42.18 |

FOREIGN PATENTS

| 202,397 | 3/1959 | Austria. |
| 152,796 | 5/1932 | Switzerland. |

ANTONIO F. GUIDA, Acting Primary Examiner.

SAMUEL KOREN, Examiner.

RAYMOND L. HOLLISTER, Assistant Examiner.